(12) United States Patent
Hess et al.

(10) Patent No.: US 8,537,009 B2
(45) Date of Patent: Sep. 17, 2013

(54) CONTAINER SECURITY DEVICES, SYSTEMS, AND METHOD

(75) Inventors: Charles T. Hess, Stillwater, ME (US); Fred Hewitt Smith, Old Town, ME (US)

(73) Assignee: Angel Secure Networks, Inc., Old Town, ME (US)

(*) Notice: Subject to any disclaimer, the term of this patent is extended or adjusted under 35 U.S.C. 154(b) by 684 days.

(21) Appl. No.: 12/596,967

(22) PCT Filed: Feb. 1, 2008

(86) PCT No.: PCT/US2008/001394
§ 371 (c)(1),
(2), (4) Date: May 10, 2010

(87) PCT Pub. No.: WO2008/127495
PCT Pub. Date: Oct. 23, 2008

(65) Prior Publication Data
US 2011/0095887 A1 Apr. 28, 2011

Related U.S. Application Data

(60) Provisional application No. 60/899,212, filed on Feb. 1, 2007, provisional application No. 60/899,088, filed on Feb. 1, 2007, provisional application No. 60/899,216, filed on Feb. 1, 2007.

(51) Int. Cl.
*G08B 13/00* (2006.01)
(52) U.S. Cl.
USPC ........... 340/541; 340/551; 340/552; 340/561; 340/565; 340/568.1; 340/571

(58) Field of Classification Search
USPC .......................................... 340/541
See application file for complete search history.

(56) References Cited

U.S. PATENT DOCUMENTS

| | | | |
|---|---|---|---|
| 4,765,512 A | 8/1988 | Bull | |
| 4,829,549 A * | 5/1989 | Vogel et al. | 378/55 |
| 5,455,926 A | 10/1995 | Keele et al. | |
| 6,995,353 B2 * | 2/2006 | Beinhocker | 250/227.14 |
| 7,777,670 B2 * | 8/2010 | Coward et al. | 342/82 |
| 2006/0023835 A1 | 2/2006 | Seppi | |
| 2006/0103520 A1 * | 5/2006 | Clark | 340/506 |

OTHER PUBLICATIONS

International Search Report for PCT/US/2008/001394 dated Sep. 17, 2008.

* cited by examiner

*Primary Examiner* — George Bugg
*Assistant Examiner* — Anthony D Afrifa-Kyei
(74) *Attorney, Agent, or Firm* — Guntin & Gust, PLC; Ralph Trementozzi

(57) ABSTRACT

A dosimeter is disclosed for use in container including outer walls defining an interior volume, the dosimeter including: a radon detection element adapted to detect a radon level for the interior volume; a neutron detection element adapted detect a neutron level for the interior volume. The dosimeter is adapted to measure the radon level and neutron level for a period of time, compare the measured radon level to a first threshold, compare the measured neutron level to a second threshold, and determine information indicative of the presence or absence of fissile material within the interior volume based on the comparisons.

19 Claims, 10 Drawing Sheets

CONTAINER SECURITY DEVICES, SYSTEMS, AND METHOD

CROSS REFERENCE TO RELATED APPLICATIONS

This application is the U.S. National Stage of International Application No. PCT/US2008/001394, filed Feb. 1, 2008, which claims priority to U.S. Provisional Application Ser. No. 60/899,212, U.S. Provisional Application Ser. No. 60/899,216, and U.S. Provisional Application Ser. No. 60/899,088, each of which were filed Feb. 1, 2007. The entire teachings of the above applications are incorporated herein by reference.

STATEMENT OF GOVERNMENT RIGHTS

This invention was made with Government support under Contract No. N66001-05-C-6014 awarded by the SPAWAR Systems Center, San Diego. The Government may have certain rights in this invention.

BACKGROUND

This disclosure relates to containers, in particular, to containers for transportation and shipping.

Based on recent domestic and foreign events, governments and the commercial sector have become concerned with the potential importing and exporting of weapons of mass destruction by terrorists or other similar organizations. By accessing a standard shipping container, a weapon such as a nuclear weapon may be placed in the container and passed undetected through a port or other import/exporting facility.

In general, approximately sixteen million twenty foot containers are in use throughout the world. Additionally, approximately 40% of the personnel that load and off-load these containers come from nations that are on the terrorist list. Bribery and sabotage are common throughout the shipping industry, including government officials, shipping companies and freight forwarders. Large quantities of contraband material now pass through maritime commerce into many ports in the US.

Most containers, including, for example, 20 foot and 40 foot dry and hi-cube shipping containers currently entering the US are made of steel. Steel is a difficult medium to scan with X-rays, since considerable energy is required to penetrate a steel wall. Substantially less energy is required to penetrate a wall made of composite material. However, composite material is typically substantially more expensive than steel. It is possible to make a container entirely from composite materials or from composite panels welded to a steel frame. A potential advantage of a composite container is that it can be manufactured so as to embed sensor grids in the composite walls, with the result that it can detect intrusions through its sides as described in U.S. Patent Publication No. 2007/0229285 filed Oct. 4, 2007 and entitled "Secure panel with remotely controlled embedded devices." However, primarily composite containers are typically substantially more expensive than a steel container.

Nuclear weapons contain fissile material. A nuclear weapon will emit radon gas and neutrons. Lead shielding will not shield radon gas and is a poor shield for neutrons. Currently available radon shielding involves an elaborate system of rubber and plastic seals. Only the United States Government has developed the technology to effectively shield radon from escaping from a nuclear weapon. It is very unlikely that a foreign adversary could produce a nuclear weapon that was shielded with lead so as to prevent the escape of gamma rays and also shielded so as to prevent the escape of radon gas and neutrons.

SUMMARY

The inventors have realized that a low power, inexpensive scanner may be used to scan composite containers for the presence of nuclear weapons. Such scanners can be used in an efficient triage and scanning system.

The inventors have also realized that plugs made of material having relatively high transmissivity to a scanning radiation beam (e.g. composite material) may be embedded in the panels of conventional containers made of material having relatively low transmissivity to a scanning radiation beam. The plugs act as windows for a scanning radiation beam (e.g. an X-ray beam), allowing the contents of the container to be scanned using relatively low power scanners. For example, the scanners may produce scanning beams having beam energies sufficient to penetrate through the plugs, but insufficient energy to penetrate the remaining portion of the container panels.

The inventors have also realized that a dosimeter, e.g. a boron dosimeter, may be placed within the interior volume of a shipping container (e.g. a sealed air-tight steel or composite container). The dosimeter is capable of detecting the radon gas levels and neutron levels in the interior volume of the container over a period of time. Because even shielded fissile material emits radon gas, the dosimeter can reliably detect the presence of such material in the container. Using the techniques described below, the dosimeter can communicate with devices (scanners, remote control units) outside of the container without the need to open or unseal the container. In this fashion, the containers can be efficiently monitored for nuclear devices (e.g. prior to loading on a transport such as a container ship).

In one aspect, a dosimeter is disclosed for use in a container including outer walls defining an interior volume, the dosimeter including: a radon detection element adapted to detect a radon level for the interior volume; a neutron detection element adapted to detect a neutron level for the interior volume. The dosimeter is adapted to measure the radon level and neutron level for a period of time, compare the measured radon level to a first threshold, compare the measured neutron level to a second threshold, and determine information indicative of the presence or absence of fissile material within the interior volume based on the comparisons.

In some embodiments, the radon detection element or the neutron detection element include a boron element.

In some embodiments, the dosimeter is adapted to: measure the change in the radon level for the interior volume during a period of time; compare the measured change in radon level to an expected change in radon level, the expected change being based on the known four day half life of radon, and output an alarm if the measured change in radon level does not substantially match the expected change in radon level.

In some embodiments, the dosimeter is adapted to determine information indicative of the amount of air circulation in the volume of the container based on the measured change in radon level.

In some embodiments, the dosimeter is adapted to measure the change in the neutron level for the interior volume during a period of time; and determine information indicative of the presence or absence of fissile material within the interior volume based on the measured change.

Some embodiments include a beam detection element adapted to detect a radiation beam directed into the interior volume of the container through one or more of the outer walls. In some embodiments, the beam detection element is adapted to demodulate a message modulated onto the detected beam.

Some embodiments include a transmitter element in communication with the beam detection element, the transmission element adapted to transmit a response message in response to the demodulated message, the response message including information indicative of the presence or absence of fissile material within the interior volume. In some embodiments, the transmitter element includes at least one from the group of: a Bluetooth transmitter, a wireless transmitter, a radio transmitter. In some embodiments, the transmitter is adapted to modulate the response message onto the scan beam.

In another aspect a system is disclosed including: a container including outer walls defining an interior volume; a dosimeter positioned within the interior volume, the dosimeter including a radon detection element adapted to detect a radon level for the interior volume; a neutron detection element adapted to detect a neutron level for the interior volume; a beam detection element; and a transmitter element. The system also includes a scanner adapted to direct a scan beam into the interior volume of the container through one or more of the outer walls and onto the beam detection element; a receiver positioned in proximity to the scanner; and a remote control unit, the remote control unit being in remote communication with the scanner and the receiver. The dosimeter is adapted to measure the radon level and neutron level for a period of time, compare the measured radon level to a first threshold, compare the measured neutron level to a second threshold, and determine information indicative of the presence or absence of fissile material within the interior volume based on the comparisons. The scanner is adapted to receive a message from the remote control unit and modulate the message onto the beam. The beam detection element is adapted to detect the beam and demodulate the modulated message. The transmitter element is adapted to transmit a response message in response to the demodulated message, the response message including information indicative of the presence or absence of fissile material within the interior volume. The receiver is adapted to receive the response message and send information indicative of the response message to the remote control unit.

Some embodiments include a crane located in proximity to the scanner and receiver, the crane in remote communication with the remote control unit. The remote control unit is adapted to control the crane to load the container onto a transport based on information indicative of the response message.

In some embodiments, the scan beam includes an x-ray beam.

In some embodiments, at least a portion of one of the walls of the container consists of a composite material, and the scanner is adapted to direct a scan beam into the interior volume of the container through the composite material.

In some embodiments, the transmitter element includes at least one from the group of: a Bluetooth transmitter, a wireless transmitter, a radio transmitter. In some embodiments, the transmitter is adapted to modulate the response message onto the scan beam.

In another aspect, a method of detecting the presence of fissile material within a container including outer walls defining an interior volume is disclosed. The method includes providing a dosimeter positioned within the interior volume; using the dosimeter, measuring a radon level and a neutron level in the interior volume for a period of time; comparing the measured radon level to a first threshold; comparing the measured neutron level to a second threshold; determining information indicative of the presence or absence of fissile material within the interior volume based on the comparisons; and outputting the information indicative of the presence or absence of fissile material within the interior volume.

Some embodiments include sealing the interior volume of container to be substantially air-tight.

Some embodiments include measuring the change in the radon level for the interior volume during a period of time; comparing the measured change in radon level to an expected change in radon level, the expected change being based on the known four day half life of radon; and outputting an alarm if the measured change in radon level does not substantially match the expected change in radon level.

Some embodiments include determining information indicative of the amount of air circulation in the volume of the container based on the measured change in radon level.

Some embodiments include measuring the change in the neutron level for the interior volume during a period of time; and determining information indicative of the presence or absence of fissile material within the interior volume based on the measured change.

Some embodiments include detecting a radiation beam directed into the interior volume of the container through one or more of the outer walls. Some embodiments include demodulating a message modulated onto the detected beam. Some embodiments include transmitting a response message in response to the demodulated message, the response message including information indicative of the presence or absence of fissile material within the interior volume.

In another aspect, a scanner is disclosed for scanning a container including a plurality of composite panels defining an interior volume. The scanner includes a beam generator adapted to emit a directed radiation scan beam having a beam energy sufficient to penetrate through at least one material of the plurality of composite but insufficient to penetrate through bulk metal material; a scan beam detector adapted to detect the scan beam, and an analyzer. The beam generator is adapted to direct the scan beam along a path into the interior volume of the container through one of the plurality of composite panels, across a portion of the interior volume, out of the interior volume through one of the plurality of composite panels, and onto the scan beam detector. The analyzer is adapted to determine information indicative of the material properties of contents of the interior volume based on the detected beam.

In some embodiments, the scan beam has a beam energy insufficient to penetrate a 2 inch thickness of solid steel material.

In some embodiments, the beam generator includes an x-ray source.

In some embodiments, the x-ray source has an operating voltage of about 200 kV or less. In some embodiments, the x-ray source includes a cobalt-60 x-ray source.

In some embodiments, the information indicative of the material properties of contents of the interior volume includes information indicative of the presence of metal in the interior volume of the container along the path of the scan beam.

In some embodiments, the beam generator is adapted to modulate a message onto the scan beam. In some embodiments, the analyzer is adapted to demodulate a message modulated on to the detected scan beam.

In some embodiments, the beam emitter is adapted to, respectively, for each of multiple points on one or more of the plurality of composite panels, direct a respective scan beam along a respective path along a path into the interior volume of the container through the respective point, across a portion of the interior volume, out of the interior volume through one of the plurality of composite panels, and onto the scan beam detector. The detector is adapted to detect each of the respective scan beams. The analyzer is adapted to, for each of the respective detected scan beams, determine information indicative of the presence or absence of metal in the portion of the interior volume along the respective scan beam path. In some embodiments, the multiple points are arranged in a regular array on one or more of the plurality of panels. In some embodiments, the regular array has an array spacing of about 6 inches or less. In some embodiments, the multiple points are spaced sufficiently closely that the information indicative of the presence of absence of metal in the ports of the interior volume along the scan beam paths includes cumulative information indicative of the presence or absence of metal at any point within the interior volume, the cumulative information having a probability of error of less than 1 in 1 trillion. In some embodiments, the multiple points consist of fewer than about 400 points.

In some embodiments, the scanner is in communication with a remote control unit. In some embodiments, the scanner is in communication with a remote control unit via the Internet.

In another aspect, a system is disclosed including a first scanner adapted to produce a relatively low energy directed radiation scan beam; a second scanner adapted to produce a relatively high energy directed radiation scan beam; and a sorting module adapted to direct containers represented to contain substantially no metal material to the first scanner and to direct containers represented to contain metal material to the second scanner. The first scanner is adapted to receive a container represented to contain substantially no metal material from the sorting module, and to scan the container to verify that substantially no metal material is present inside the container. The second scanner is adapted to receive a container represented to contain metal material from the sorting module, and to scan the container to detect the presence of a nuclear device.

Some embodiments include a third scanner adapted to produce a relatively moderate energy directed radiation scan beam. The sorting module is adapted to direct containers represented to contain metal material having a density above a threshold value to the second scanner, and to direct containers represented to contain metal material consisting only of metal material having a density below the threshold value to the third scanner. The third scanner is adapted to receive a container represented to contain metal material consisting only of metal material having a density below the threshold value from the sorting module, and to scan the container to verify that substantially no material is present inside the container having a density above the threshold value. In some embodiments, the threshold value corresponds to a density less than the density of fissile material.

In another aspect, a method for scanning a container including a plurality of composite panels defining an interior volume is disclosed. The method includes generating a directed radiation scan beam having a beam energy sufficient to penetrate through at least one of the plurality of composite panels but insufficient to penetrate through bulk metal material, directing the scan beam along a path into the interior volume of the container through one of the plurality of composite panels, across a portion of the interior volume, out of the interior volume through one of the plurality of composite panels, and onto a scan beam detector, detecting the scan beam with the scan beam detector, analyzing the detected beam to determine information indicative of the material properties of contents of the interior volume based on the detected beam; and outputting the information indicative of the material properties of contents of the interior volume.

In some embodiments, the scan beam includes an x-ray beam. In some embodiments, the scan beam has a beam energy insufficient to penetrate a 2 inch thickness of solid steel material.

In some embodiments, the information indicative of the material properties of contents of the interior volume includes information indicative of the presence of metal in the interior volume of the container along the path of the scan beam.

Some embodiments include modulating a message onto the scan beam. Some embodiments include demodulating a message modulated onto the detected scan beam.

Some embodiments include, respectively, for each of multiple points on one or more of the plurality of composite panels, directing a respective scan beam along a respective path into the interior volume of the container through the respective point, across a respective portion of the interior volume, out of the interior volume through one of the plurality of composite panels, and onto the scan beam detector; detecting each of the respective scan beams, and for each of the respective detected scan beams, determining information indicative of the presence or absence of metal in the portion of the interior volume along the respective scan beam path.

In another aspect, a method of sorting and scanning multiple containers each including a plurality of composite panels defining an interior volume is disclosed. The method includes providing a first scanner adapted to produce a relatively low energy directed radiation scan beam; providing a second scanner adapted to produce a relatively high energy directed radiation scan beam; directing a container represented to contain substantially no metal material to the first scanner; directing a container represented to contain metal material to the second scanner; receiving the container represented to contain substantially no metal material at the first scanner, and scanning the container to verify that substantially no material is present inside the container, and receiving the container represented to contain metal material from the sorting module, and scanning the container to detect the presence of a nuclear device.

In another aspect a container is disclosed including: a plurality of panels that define the volume of the container, the panels including a material having relatively low transmissivity to radiation; and at least one plug embedded in at least one of the panels, the plug consisting of a material having relatively high transmissivity to radiation. In some embodiments, the material having relatively low transmissivity to radiation includes a metal and the material having relatively high transmissivity to radiation includes a composite material. In some embodiments, at least one plug consists of a material having a relatively high transmissivity of x-ray radiation and the panels include a material having a relatively high transmissivity of x-ray radiation.

In some embodiments, at least one plug includes: a first plug embedded in a first panel of the plurality of panels; and a second plug embedded in a second panel of the plurality of panels. The first and second plug are aligned opposing each other such that a beam of radiation directed into the volume of the container through the first plug will exit the volume of the container through the second plug.

In some embodiments, at least one plug includes: a first plug embedded in a first panel of the plurality of panels and a plurality of plugs embedded in a second panel of the plurality of panels. The first plug includes a lens element or scattering element adapted to receive a beam of radiation directed into the volume of the container through the first plug and direct portions of the beam to exit the volume of the container through each of the plurality of plugs embedded in the second panel.

In some embodiments, at least one plug includes: a first plurality of plugs embedded in a first panel of the plurality of panels; and a second plurality of plugs embedded in a second panel of the plurality of panels. Each plug of the first plurality of plugs is aligned opposing at least one respective plug of the second plurality of plugs such that a beam of radiation directed into the volume of the container through the plug of the first plurality of plugs will exit the volume of the container through at least one respective plug of the second plurality of plugs.

The first plurality of plugs and second plurality of plugs are arranged such that substantially all of the volume can be accessed by scanning beams of radiation which are directed into the volume through a plug from the first plurality of plugs, pass through a portion of the volume, and exit the volume through a plug from the second plurality of plugs.

Some embodiments include a fabric liner disposed adjacent the plurality of panels to enclose a portion of the volume of the container. The fabric liner includes one or more sensor elements adapted to detect an intrusion into the enclosed portion. One or more of the sensor elements is in communication with at least one plug. In some embodiments, one or more sensor elements include at least one of: an electrical grid, and an optical grid. In some embodiments the fabric liner is adapted to: receive a message modulated on a radiation beam directed through at least one plug and; transmit a response indicating the presence or absence of an intrusion into the enclosed portion.

In some embodiments, the fabric liner contains one or more storage modules adapted to store electronic identification information. The fabric liner is adapted to: receive a message modulated on a radiation beam directed through at least one plug and; transmit a response based on the stored identification information.

In some embodiments, the container includes: a dosimeter positioned within the volume of the container and adapted to detect the presence of fissile material within the volume of the container; a communication module positioned within the volume of the container and in communication with the dosimeter. The communication module is adapted to: receive a message modulated on a radiation beam directed through at least one plug and transmit a response indicating the presence or absence of an intrusion into the enclosed portion. In some embodiments, the communication module includes at least one of the group of: a Bluetooth transmitter, a wireless transmitter, a radio transmitter.

In another aspect, a system is disclosed including: a container which includes a plurality of panels that define the volume of the container, the panels including a material having relatively low transmissivity to radiation; at least one plug embedded in at least one of the panels, the plug consisting of a material having relatively high transmissivity to radiation. The system also includes a scanner including: a beam generator adapted to emit a radiation beam having a beam energy sufficient to penetrate at least one plug consisting of a material having relatively high transmissivity to radiation and insufficient to penetrate portions of the plurality of panels including the material having relatively low transmissivity to radiation.

In some embodiments, at least one plug includes a first plug embedded in a first panel of the plurality of panels and a second plug embedded in a second panel of the plurality of panels. The first and second plugs are aligned opposing each other. The beam generator is configured to direct the radiation beam into the volume of the container through the first plug, across a portion of the volume of the container, and out of the volume of the container through the second plug. The scanner includes a detector adapted to detect the radiation beam exiting out of the volume of the container through the second plug.

In some embodiments, the volume of the container contains cargo material, and the scanner is adapted to determine information indicative of the material properties of the cargo material based on the detected radiation beam. In some embodiments, the information indicative of the material properties of the cargo material includes information indicative of the presence of at least one of the group of: metal, fissile material, electronic components.

In some embodiments, at least one plug includes a first plurality of plugs embedded in a first panel of the plurality of panels and a second plurality of plugs embedded in a second panel of the plurality of panels, where each plug of the first plurality of plugs is aligned opposing at least one plug of the second plurality of plugs. The scanner includes a plurality of beam generators, each beam generator configured, respectively, to emit a radiation beam having a beam energy sufficient to penetrate the at least one plug consisting of a material having relatively high transmissivity to radiation and insufficient to penetrate portions of the plurality of panels including the material having relatively low transmissivity to radiation; and direct the beam into the volume of the container through a respective one of the first plurality of plugs, across a portion of the volume of the container, and out of the volume of the container through a respective one of the second plurality of plugs.

Some embodiments include a remote control unit in remote communication with the scanner and with a receiver unit located in proximity to the scanner, and a communication module located within the volume of the container. The scanner unit is adapted to modulate a message received from the remote control unit onto at least one beam, and to direct the modulated beam into the volume of the container through the at least one plug. The communication module is adapted to receive the modulated beam, demodulate the message from the beam, and transmit a response signal based on the demodulated message. The receiver unit receives the response signal and transmits information indicative of the response signal to the remote control unit.

Some embodiments include a dosimeter (e.g. a radon dosimeter) located within the volume of the container and adapted to detect the presence of fissile material within the volume of the container. The communication module is in communication with the dosimeter, and the response signal includes information indicative of the presence of fissile material within the volume of the container.

In yet another aspect, a method is disclosed including: providing a container including: a plurality of panels that define the volume of the container, the panels including a material having relatively low transmissivity to radiation; and at least one plug embedded in at least one of the panels, the plug consisting of a material having relatively high transmissivity to radiation; generating a radiation beam having a beam energy sufficient to penetrate at least one plug consisting of a material having relatively high transmissivity to radiation and insufficient to penetrate portions of the plurality of panels including the material having relatively low transmissivity to radiation; and directing the beam into the volume of the container through at least one plug.

In some embodiments, at least one plug includes a first plug embedded in a first panel of the plurality of panels and a second plug embedded in a second panel of the plurality of panels, and where the first and second plug are aligned opposing each other. The method includes directing the radiation beam into the volume of the container through the first plug, across a portion of the volume of the container, and out of the volume of the container through the second plug, and detecting the radiation beam exiting out of the volume of the container through the second plug.

In some embodiments, the volume of the container contains cargo material. The method includes determining information indicative of the material properties of the cargo material based on the detected radiation beam, and outputting the information.

Various embodiments may include any of the above described features, alone or in any combination. These and other features will be more fully appreciated with reference to the following detailed description which is to be read in conjunction with the attached drawings.

It is to be understood that, as used herein, the term "detecting a beam" and related terms refer to detecting any property of a beam of radiation (e.g. an x-ray beam) including, but not limited to: intensity, fluence, cross section, wavelength, pulse duration, etc. Further detecting a beam may include detecting the interruption or blocking of a beam. (e.g. when an x-ray beam is blocked by metallic material positioned between the beam source and the detector).

BRIEF DESCRIPTION OF THE DRAWINGS

The foregoing and other objects of this disclosure, the various features thereof, may be more fully understood from the following description, when read together with the accompanying drawings in which.

DETAILED DESCRIPTION

Composite Container Scanner and Triage System

Figure 1:
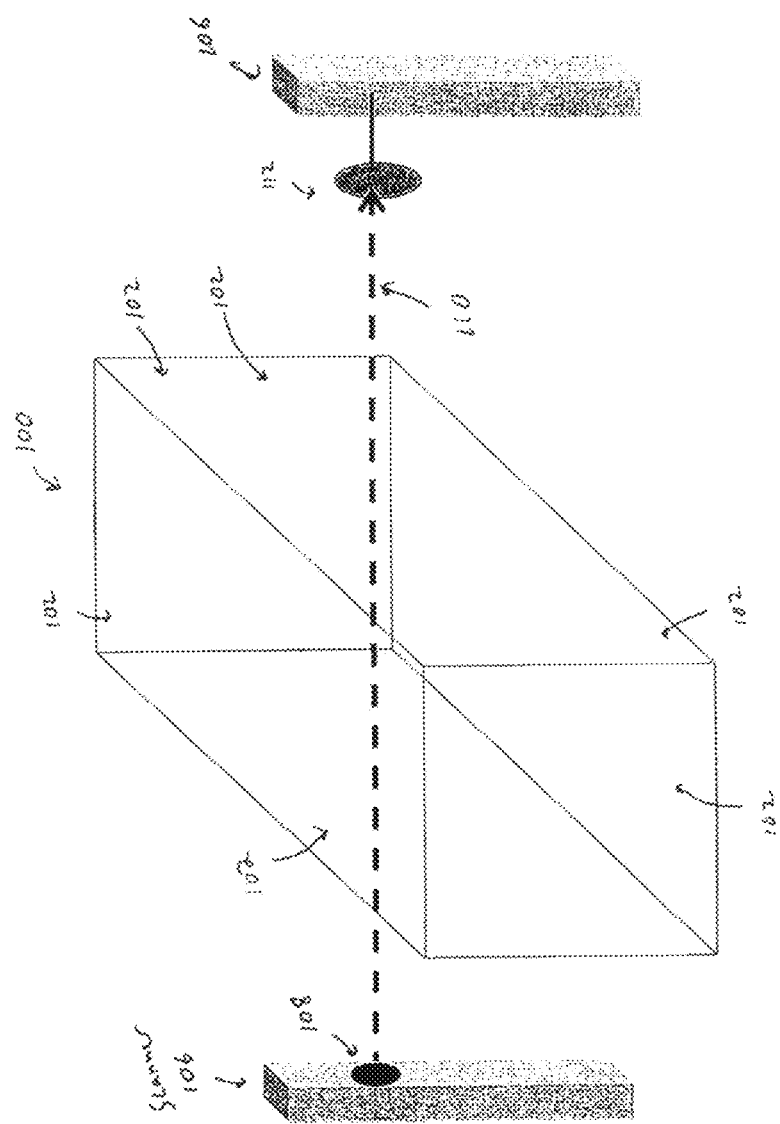
FIG. 1 shows a perspective view of a container and a scanning system.

Referring to FIG. 1, container 100 is constructed from composite panels 102 enclosing an interior volume. Scanner 106 includes directed radiation beam emitter source 108 which produces scan beam 110. Scan beam 110 is directed along a path which travels through a side panel 102 of container 100 into the interior volume, across a portion of the interior volume, out of opposing side panel 102, and onto detector 112. Scanner 106 includes directed x-ray beam emitters 108. A detector signal from detector 112 is transmitted to a remote control unit (not shown), and analyzed to determine the material properties of cargo (not shown) loaded in the interior volume of container 100. For example, the detector signals can be analyzed to determine the presence of metals, fissile material, medium density material (e.g. electronic components), etc. In some embodiments detector 110 may be in communication with a local analyzer, such as a personal computer or laptop.

In the illustrated embodiment, where container 100 is a rectangular parallelpiped, scan beams 110 and their respective emittiters 108 and detectors 112 are along axes parallel to one of the sidewalls of container 100. In some embodiments, beams 110 and their respective emittiters 108 and detectors 112 may be angularly offset with respect to the container sidewall.

Because panels 102 are made of composite material having relatively high transmissivity (e.g. in comparison to metal, such as steel), scan beam 110 need not be a high energy beam. Accordingly emitter 108 may be an inexpensive, relatively low power beam emitter. For example, emitter 108 may have sufficient power to penetrate composite panels 102 and low density, non-metal cargo loaded into the interior volume of container 100, but insufficient power to penetrate dense, bulk metal (e.g. steel, lead, fissile material) etc. In such a case, an interruption of scan beam 110 measured by detector 112 would indicate the presence of dense metal material in the interior volume.

In various embodiments, emitter 108 may be low-voltage x-ray source (e.g. a 200 kV or less x-ray source) or a cobalt-60 x-ray source. A scanner including such a source could be manufactured at a cost of about $10,000 or less. In contrast, to generate a scan beam with sufficient energy to penetrate a steel container would require a high voltage x-ray source operating at 3000 kV or more.

Figure 2:
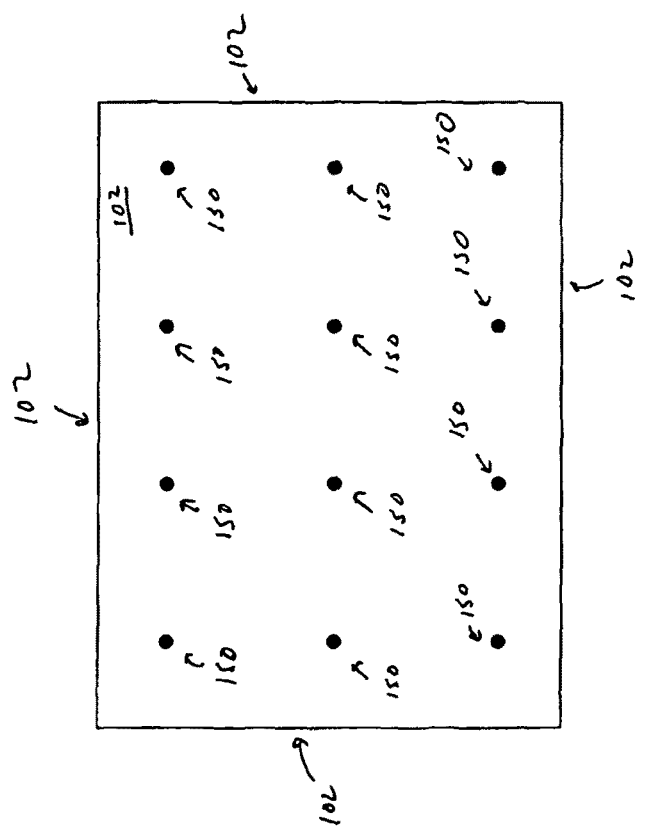
FIG. 2 illustrates a scanning pattern on a container panel.

Container 100 can be moved relative to scanner 108 and detector 112 (e.g. by driving a truck hauling the container past scanner 106) to allow scan beam 110 to be directed through additional points on side panel 102 such that additional portions of the interior volume are scanned. Alternatively, scanner 108 and detector 112 may be moved relative to container 100 to scan different portions of the interior volume. For example, referring to FIG. 2, a scan could sample data points for scan beams directed through points 150 on side panel 102 located every six inches vertically and horizontally. For example, for a 20 foot by 5 foot panel a total of (40*10)=400 data points might be sampled, with each data point indicating the presence or absence of metal along the scan beam passing through a given point. The results of this scan may be analyzed and compared to a threshold to determine the presence of, for example, a nuclear device. For example, if less than 30 of the 400 data points in the example above showed the presence of metal, it may be determined that the container does not contain a nuclear weapon with a probability of error of 1 part in 1 trillion. The 400 point data sample will be compressible into a computer file size of 40 bytes, allowing easy storage or transmission to, for example, a remote monitoring or control unit.

In some embodiments, scanner 106 may contain multiple emitters: 108 which may produce multiple scan beams 110 simultaneously or sequentially. As described in greater detail below, in some embodiments only select portions of one or more of panels 102 of container 100 consist of composites with the remainder being made up of metal (e.g. steel). The composite portions allow scan beam 110 to access the interior volume of the container.

As will be discussed in greater detail below, in some embodiments it is possible to place a detector inside a shipping container 100 that could detect a scan beam 110. With an appropriate detector, messages could be modulated over the scan beam and demodulated by the detector, so that the scanner could communicate with the detector inside the container. Such communication capability could be useful for a remote monitor to communicate (e.g. using wireless, radio, or Bluetooth links) with a sensor or identification elements inside the container and also to communicate with the same container over the scan beam. This would allow remote assurance that the container in front of the scanner was the same container that was in communication with the remote monitor.

Approximately 66% of container traffic inbound to the West Coast of the US is volume limited. Of this traffic, half contains no metal (i.e. clothing and shoes), a quarter contains electronic parts and games, and the remainder contains other goods such that a full 20 ft. container weighs less than the maximum weight of 67,200 lbs. A scanner slightly more powerful than the type of scanner discussed above could be built that would penetrate a cargo consisting of light electronic goods but would be blocked by dense metal. A nuclear weapon will contain dense metal, even if not shielded with lead. If shielded with lead, it will be even denser. Consequently, 33% of the inbound West Coast Cargo traffic could be scanned with an inexpensive scanner and declared not to contain metal, provided the cargo were transported in a composite container. On the assumption that if a container does not contain metal, it does not contain a nuclear weapon, 33% of the inbound container traffic to the West Coast can be inexpensively scanned and declared safe.

In the following, an exemplary scanning and triage system is disclosed for efficiently scanning multiple at least partially composite containers for the presence of a hidden nuclear device.

Figure 3:
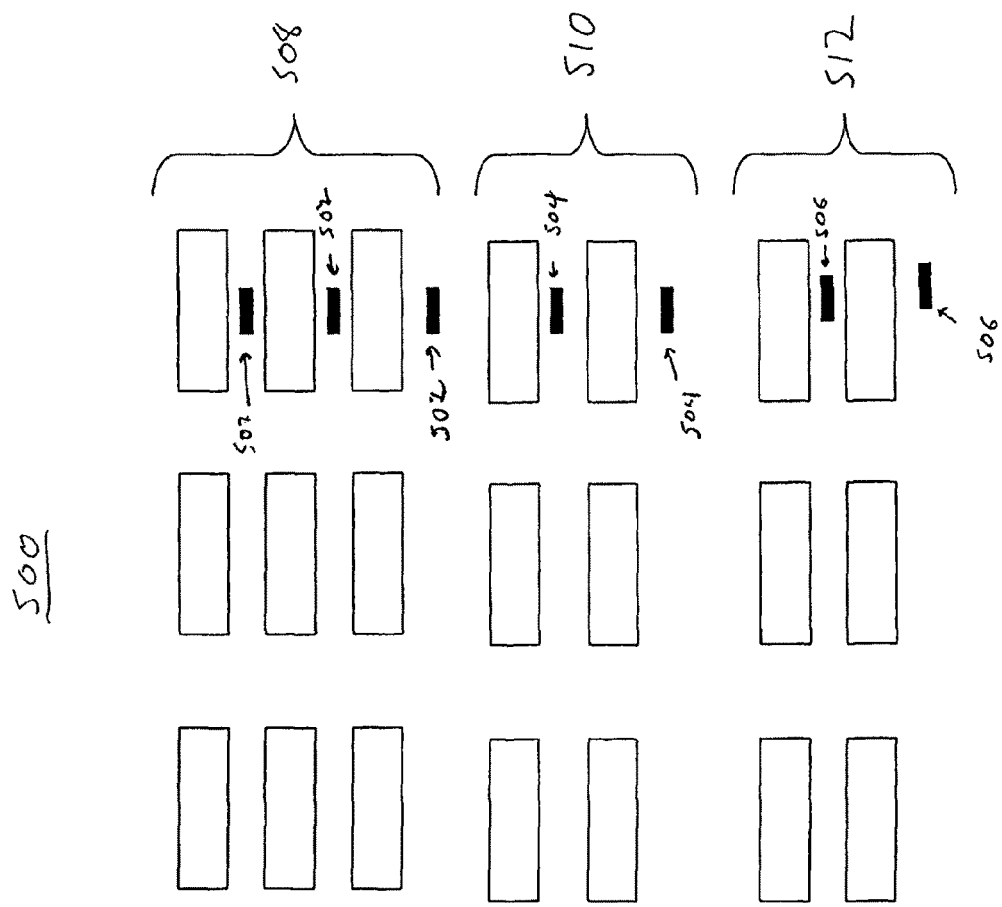
FIG. 3 illustrates a triage and scanning system.

Referring to FIG. 3, system 500 includes one or more low power scanners 502 having a scan beam with insufficient energy to penetrate dense metals or medium density partially metallic material (e.g. electronic components). The system also includes one or more medium power scanners 504 having a scan beam with insufficient energy to penetrate dense metals but sufficient energy to penetrate medium density partially metallic material (e.g. electronic components). The system also includes one or more high power scanners 506 having a scan beam with sufficient energy to penetrate dense metals.

Any of scanners 502, 504, 506 could be coupled with a data collection program on a lap top or remote monitoring unit which analyzes scan data using one or more of the techniques described above to determine information about the content of the containers.

Containers 508 that are represented as containing non-metallic low density material such as clothing are directed to low power scanners 502. Containers 508 which pass this scan (i.e. if no metal is detected in the container) are declared not to contain a nuclear weapon. These containers would not have to be scanned by a more powerful and more expensive scanner. Approximately one third of in-bound container traffic in the U.S. is of this type. This will save money in scanning equipment and delay.

Containers 510 that are represented as containing electronic components or other medium density cargo are directed to the medium power scanners 506 suitable for this type of cargo. Containers 510 which pass this scan (i.e. if no metal having a density greater than that typical of medium density cargo is detected) are declared not to contain a nuclear weapon. These containers would not have to be scanned by a more powerful and more expensive scanner. Approximately one third of in-bound container traffic is medium density. This will save money in scanning equipment and dock delay.

Containers 512 that are represented as containing high density metallic material are directed to high power scanners 512. These scanners can scan the containers for nuclear weapons using, for example, high energy x-ray scanning techniques known in the art. Containers 512 which pass this scan (i.e. if no metal having a density greater than that typical of medium density cargo is detected) are declared not to contain a nuclear weapon.

In some embodiments, containers 508, 510, 512, are secured so that after scanning the container, a breach through any of its six sides will be detected (e.g. using a sensor grid embedded in the composite panels of the containers of the type described in U.S. Patent Publication No. 20070229285 filed Oct. 4, 2007 and entitled "Secure panel with remotely controlled embedded devices"). In such a case, it would be feasible to scan containers at some distance from a dock where the containers are loaded onto a ship bound for the United States. As shown in FIG. 3, because containers 508, 510, and 512 can be scanned some distance from the dock, it is feasible to provide numerous scanning lanes for container scanning. In typical settings, a great number of such lanes might not be feasible at dockside, where space is limited. Because the need for expensive high power scanners 506 is limited, numerous scanning lanes having low and medium power scanners 502, 504 may be provided at a relatively low cost.

Further, as described above, analysis of the presence or absence of dense metal is very simple and requires very little data and very little data analysis. Consequently, low and medium power scanners 502, 504 (and, in some embodiments, even high power scanners 506) may be automated and/or remotely managed. For example, scanners 502, 504, and 506 may be automated using a system analogous to the familiar toll booth automation systems used on highways. Automated scanning reduces or eliminates the need for on-site operators. This will reduce costs and security risks. For example, it will not be necessary to place trust in an on-site operator. This will be a significant advantage in the maritime shipping environment, which is, unfortunately notoriously corrupt in certain venues.

Dosimeter

Figure 4:
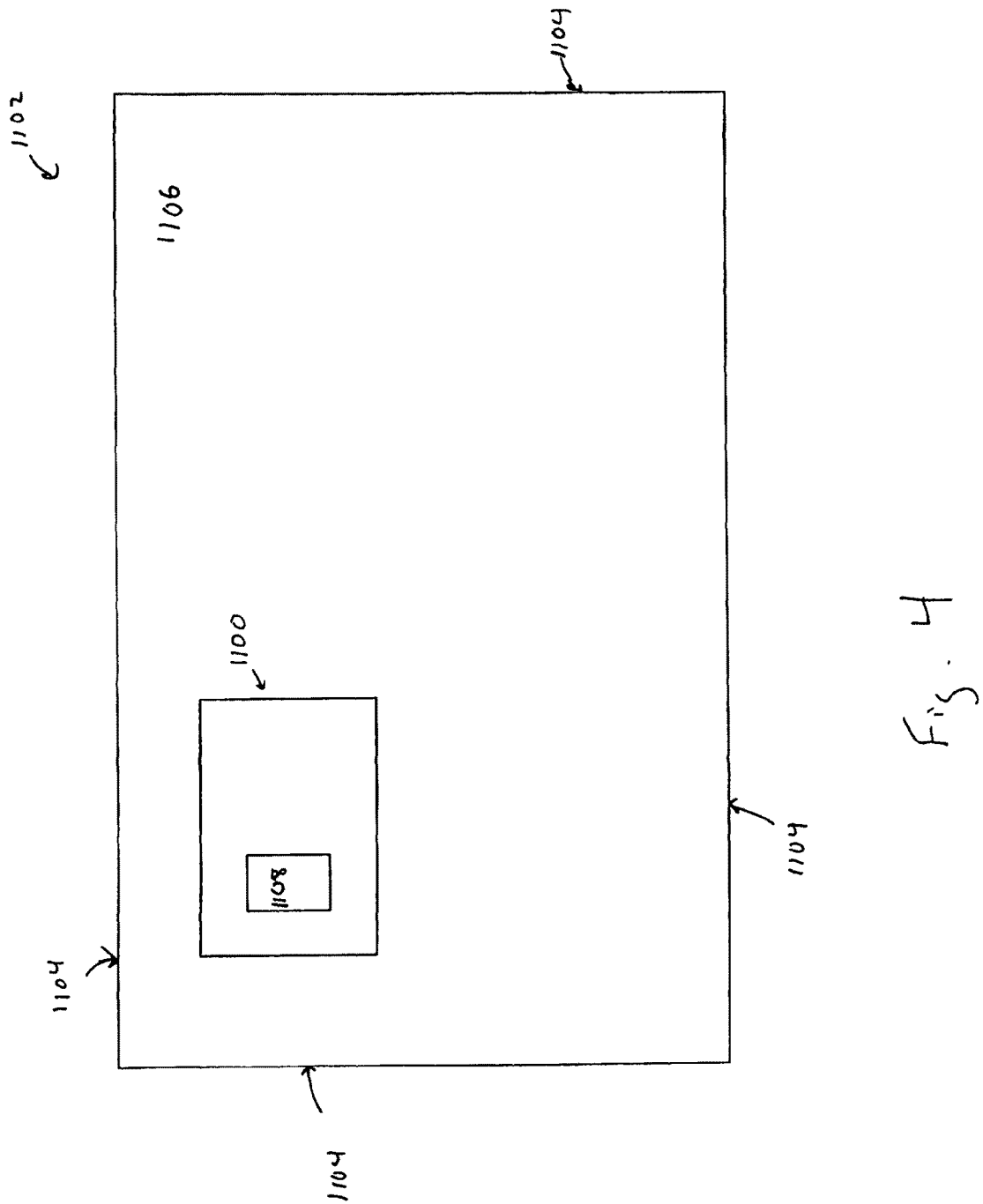
FIG. 4 is a block diagram showing a dosimeter installed in a container.

Referring to FIG. 4, dosimeter 1100 is positioned inside of container 1102. Container 1102 has exterior walls 1104 defining an interior volume 1106. Exterior walls 1104 may be metal (e.g. steel), composite, or some combination thereof (e.g. composite panels on a steel frame or steel panels with embedded composite plugs). Interior volume 1106 may be sealed air-tight, such that air does not circulate between the exterior environment and the interior volume.

Dosimeter 1100 includes a boron element 1108 capable of measuring the level of radon gas and the neutron level within interior volume 1106. For example, dosimeter 1100 may be a commercial off-the-shelf radon detector. In some embodiments, such an off-the-shelf detector may be made more sensitive by modifying boron element 1108, using techniques known in the art.

As noted above, detection of radon and neutrons is a good indicator of fissile material. Substances that do not contain fissile material will typically not produce radon and neutrons.

When interior volume 1106 of container 1102 is sealed such that the air volume does not circulate, if dosimeter senses less than a threshold number of neutrons and a threshold radon level over a period of time, the probability that the container contains a nuclear weapon approaches zero. The threshold levels and time periods can be easily determined based on measured background neutron and radon levels for a given container type and/or known neutron and radon emission rates for fissile material.

Figure 5:
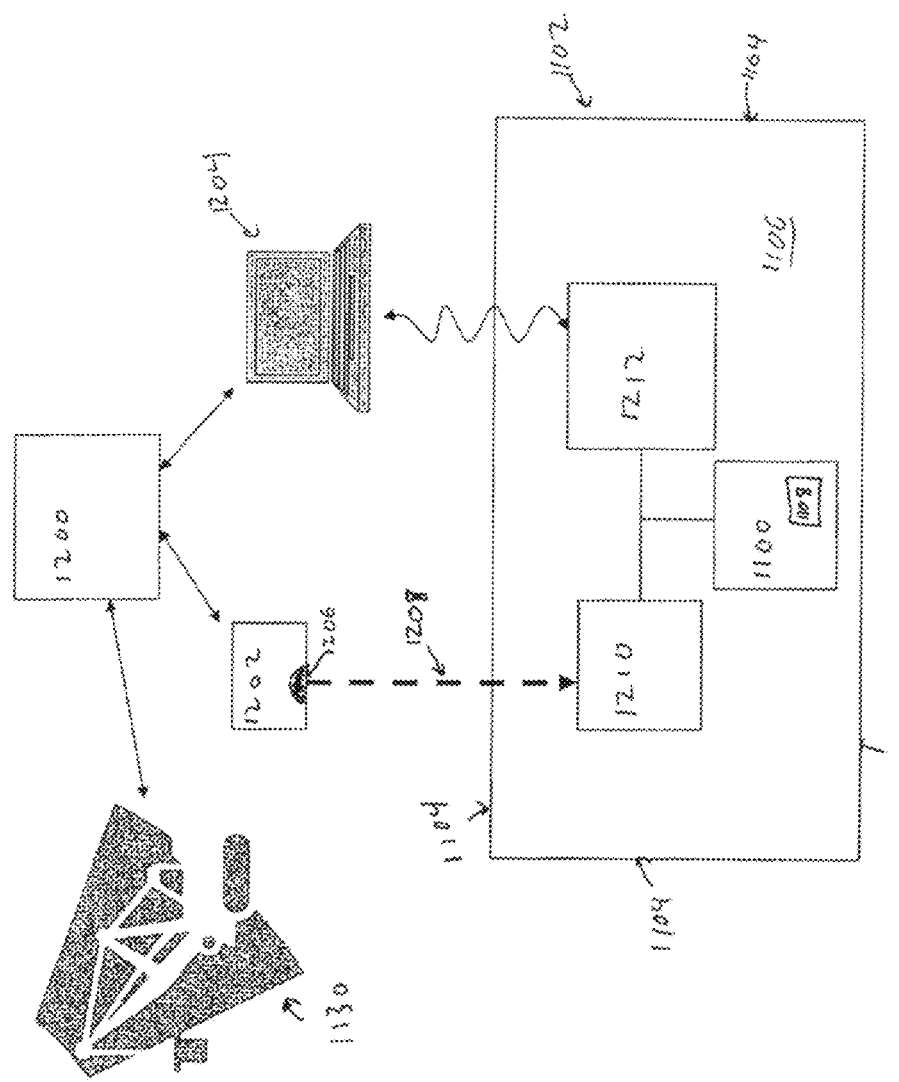
FIG. 5 illustrates a scanning system for use with a dosimeter installed in a container.

In some embodiments, dosimeter 1100 can communicate with devices external to container 1102. For example, referring to FIG. 5, remote controller 1200 is in communication (e.g. over an Internet connection) with scanner 1202 and receiver unit 1204 (e.g. a computer) located in proximity to scanner 1202. Scanner 1202 includes beam emitter 1206 which directs a radiation beam 1208 (e.g. an x-ray beam) through panel 1104 onto beam detector element 1210, which is in communication with dosimeter 1100. Scanner 1202 receives a message from remote control unit 1200 and operates to modulate the message onto beam 1208 emitted. Detector 1210 detects beam 1110 and demodulates the message. In response to the message, dosimeter 1100 outputs information indicating whether fissile material has been detected inside container 1102. This information is sent to transmitter 1212 which transmits a response message based on the demodulated message and the information output by dosimeter 1100. The response signal may be sent using a non-directed signal, for example using a radio broadcast or other wireless transmission. As shown, the response message is transmitted over an antenna to a Bluetooth receiver in receiver unit 1204. Receiver unit 1204 then passes the message to remote control unit 1200, thereby providing remote monitoring of container 1102 for fissile material. In some embodiments, beam 1208 is directed into interior volume 1106 through a portion of panels 1104 composed of a material having relatively high transmissivity to the radiation beam (e.g. a composite material). This allows emitter 1206 to be a relatively low powered source, e.g. a low voltage (200 kV or less) x-ray source or a cobalt-60 x-ray source.

Note that the above described arrangement provides a closed loop so that a remote monitor can be assured of the position of a particular container while communicating with it. The scan beam 1208 is a directed beam, which can be used to assure that the container is located in a particular place, whereas the communication link between transmitter 1212 and receiver 1204, e.g. using Bluetooth, is a non-directed wave that will only locate a container within the Bluetooth range.

This capability of using a communication path consisting of both a directed beam and a non-directed Bluetooth wave would allow a remote monitor to assure that the container with which it was communicating was the container actually being scanned. The ability to assure that a particular container is in front of the scanner is important to avoid various ploys that might be attempted by a clever adversary to avoid the container scanning process. In some embodiments, scanner 1202 and receiver 1204 may be positioned on or in proximity to loading crane 1130. This allows for a positive identification of container 1102 and a determination that it does not contain a nuclear device immediately prior to loading onto a transport (e.g. a maritime container ship, train, truck, etc.). Of course, identification and determination may additionally or alternatively be made during or after loading and/or before during or after off-loading.

Figure 6:
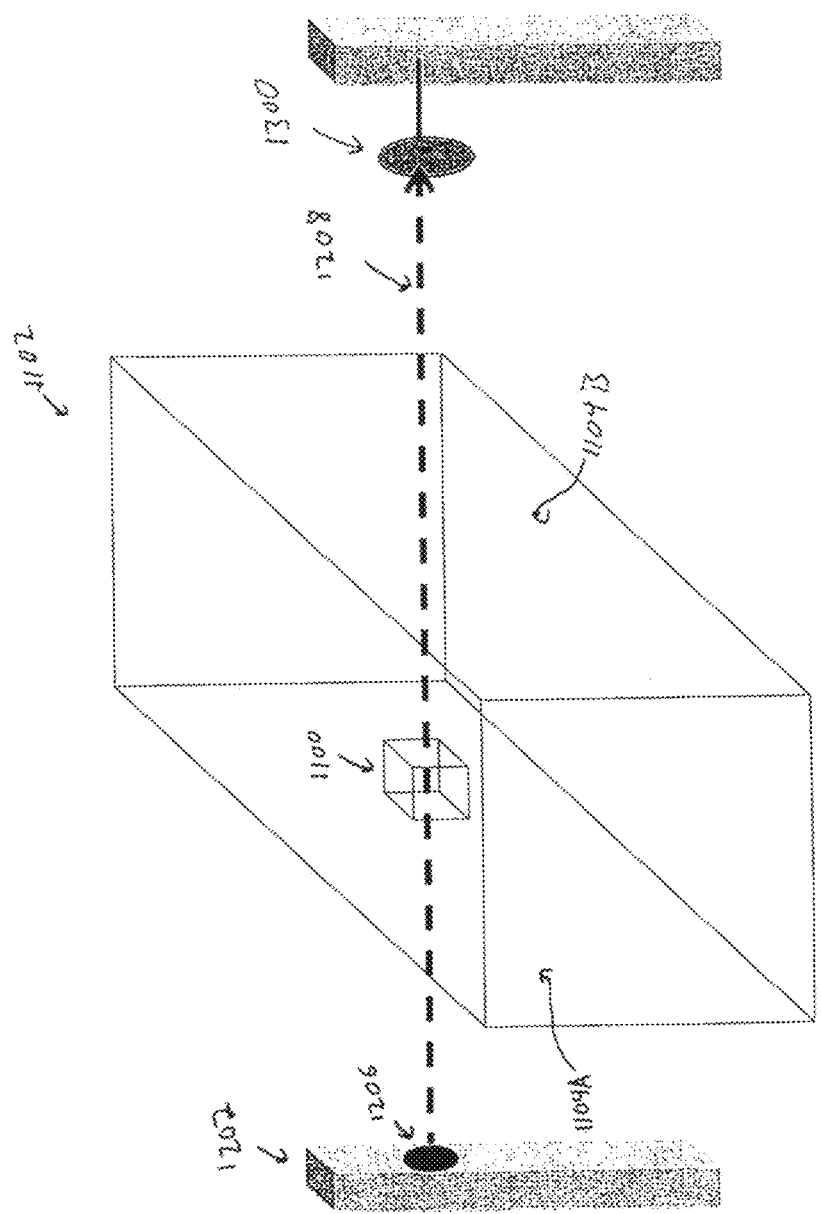
FIG. 6 a perspective view of a dosimeter installed in a container and a scanning system.

Referring to FIG. 6, in some embodiments, scanner 1202 emits scan beam 1208 from emitter 1206 which is directed along a path which enters container 1102 through a first panel 1104A, passes through dosimeter 1100, exits container 1102 through a second panel 1104B and is detected by detector 1300. As described above, a query message (e.g. from a remote control unit) is modulated onto beam 1208. Beam 1208 is detected by dosimeter 1100 (e.g. either directly using boron element 1108, or using a separate detector unit), and the message demodulated. In response to the demodulated query, dosimeter 1100 outputs information indicating whether fissile material has been detected inside container 1102. This information is included in a response message modulated onto beam 1208 by a modulator integral with or in communication with dosimeter 1100. Detector 1300 detects beam 1208 after it exits container 1100, and demodulates the response message. Detector 1300 may communicate the response message to a remote controller (not shown), e.g., using an Internet link.

Composite Plugs

Figure 7:
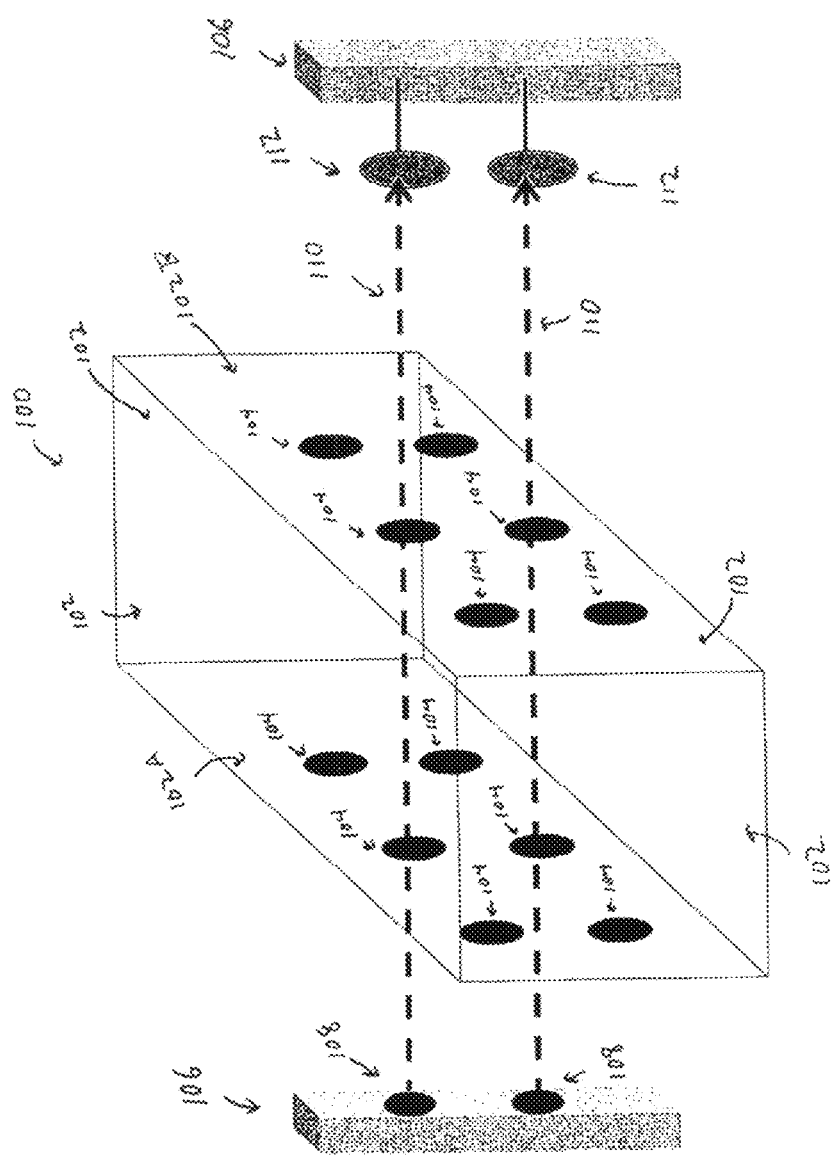
FIG. 7 shows a perspective view of a container with composite plugs and a scanning system.

Referring to FIG. 7, container 100 is constructed from steel panels 102, 102A, 102B enclosing an interior volume. Plugs 104 of composite material are embedded in side panels 102A and 102B. The composite plugs 104 have relatively high transmissivity to x-ray radiation while steel panels 102, 102A, 102B have relatively low transmissivity. Accordingly, composite plugs 104 act as x-ray "windows" into the interior volume of container 100.

In the illustrated embodiment, where container 100 is a rectangular parallelpiped, scan beams 110 and their respective emitters 108 and detectors 112 are along axes parallel to one of the sidewalls of container 100. In some embodiments, beams 110 and their respective emitters 108 and detectors 112 may be angularly offset with respect to the container sidewall.

Each plug 104 in side panel 102A is located directly opposite to a plug 104 in side panel 102B. Scanner 106 includes directed x-ray beam emitters 108. The emitters 108 each direct scan beams 110 through one plug 104 in sidewall 102A, then through the interior volume of container 100, then through another plug 104 on the opposite sidewall 102B and on to a detector 112 outside on the other side of the container. The detector signals are transmitted to a remote control unit (not shown), and analyzed to determine the material properties of cargo (not shown) loaded in the interior volume of container 100. For example, the detector signals can be analyzed to determine the presence of metals, fissile material, medium density material (e.g. electronic components), etc. Because scan beams 110 need not penetrate the steel portions of side panels 102A, 102B, emitters 108 may be inexpensive, relatively low power beam emitters. For example, in various embodiments, emitters 108 may be low-voltage x-ray source (e.g. a 200 kV x-ray source) or a cobalt-60 x-ray source.

Container 100 can be moved relative to scanner 106 and detectors 112 (e.g. by driving a truck hauling the container past scanner 106) to allow scan beams 110 to be directed through additional pairs of plugs to allow other areas of the interior volume to be scanned. Alternatively, scanner 108 and detector 112 may be moved along the length of the container to access different pairs of plugs 104. In some embodiments, container 10 and scanner 108 and detectors 110 remain stationary during each scan event. For some applications, e.g. for detecting the presence of nuclear weapons, a sufficient quantity of plugs 104 are provided such that that no matter where the weapon was located within the interior, it could be detected by the scan.

Composite plugs 104 may be inserted into panels 102A, 102B by an operation after the steel panel is stamped, or the operation could be integrated into the stamping operation.

In some embodiments, composite plugs 104 have considerable structural strength so that insertion of a plug would not degrade the structural strength of the steel container.

In some embodiments, plugs 104 could be retrofitted to an existing steel container 100 at a modest cost so as to overcome the significant cost disadvantage of all-composite containers.

Figure 8:
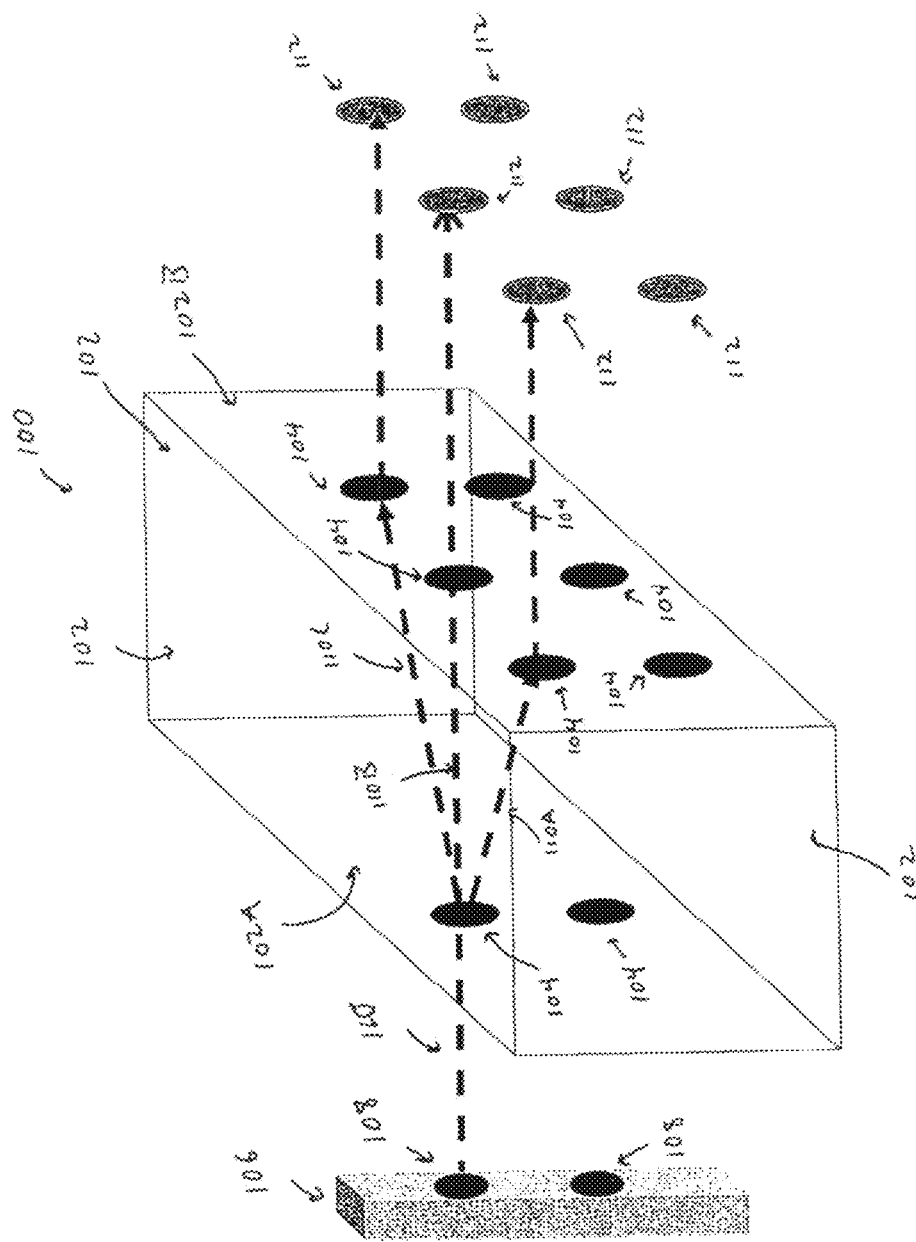
FIG. 8 shows a perspective view of a container with composite plugs and a scanning system.

Referring to FIG. 8, in some embodiments, one or more of the composite plugs 104 located in side panel 102A contain a lens or scattering element that directs or scatter the incoming beam 110 to form beams 110A, 110B, and 110C, which travel along different paths through the interior volume of container 100. Each of beams 110A, 110B, and 110C exit the container through a different composite plug 104 in side panel 102B and is detected by a detector 112. Thus, a given input beam 110 generates beams 110A, 110B, and 110C which would be detectable by the detector 112 immediately opposite and by detectors 112 the left and right (and/or above and below depending on the type of lens or scattering element). Accordingly, each scanning beam emitted from scanner 108 is able to scan a larger portion of the interior volume of container 100 than in the configuration shown in FIG. 7.

In some embodiments, several inexpensive beam emitters 108 might be arrayed vertically. Opposite these beams, several detectors 112 would be arrayed both horizontally and vertically. In some embodiments beam sources 108 are pulsed sequentially so that the detected pulse could be measured separately for each beam pulse. In some such embodiments, it might be necessary to stop container 100 and scan it while it was stationary rather than driving the container through a scanner. In some embodiments, indicial markers or position detectors may be used to ensure proper alignment of plugs 104 and scanner 106.

Figure 9:
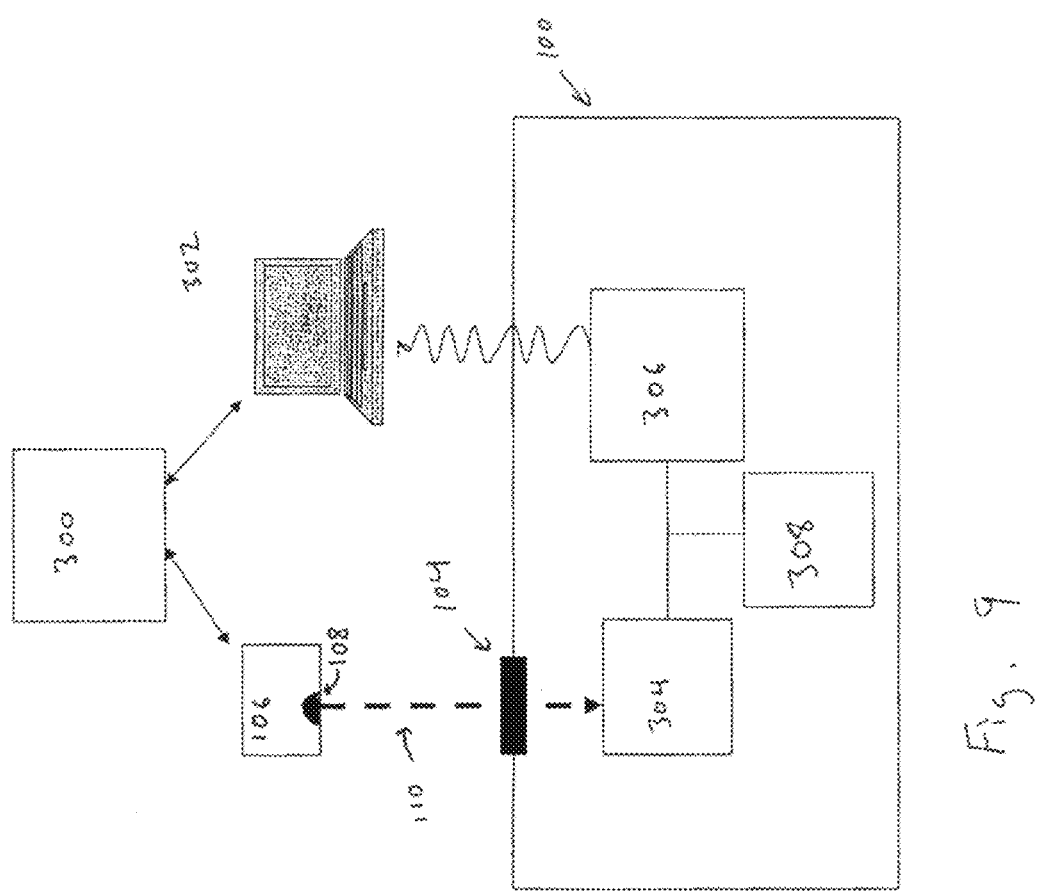
FIG. 9 is a block diagram of a remotely controlled scanning system and container with composite plug.

Referring to FIG. 9, remote controller 300 is in communication (e.g. over an Internet connection) with scanner 106 and computer 302 located in proximity to scanner 106. Scanner 106 operates to modulate a message on beam 110 emitted by emitter 108. Beam 110 is directed through composite plug 104 into the interior volume of container 100. Detector/demodulator 304 positioned within container 100 detects beam 110 and demodulates the message. Transmitter 306 transmits a response message based on the demodulate message, e.g. over an antenna to a Bluetooth receiver in computer 302. In some embodiments, other types of transmission can be used including radio, wireless, etc. The above described arrangement provides a round trip loop so that a remote monitor could be assured of the position of a particular container while communicating with it.

In some embodiments, a dosimeter 308 is located inside the container. Dosimeter 308 detects the presence of even shielded fissile material. Dosimeter 308 is in communication with detector/demodulator 304 and transmitter 306. A query message is sent from remote monitor 300 via modulated beam 110 through plug 104 to detector/demodulator 304. In response to this massage, information indicating the presence or absence of fissile material is sent from dosimeter 308 via transmitter 306 to computer 302 and on to remote monitor 300. In some such embodiments, a single composite plug could be inserted into the container allowing communication with dosimeter 308 and reducing or eliminating the need to actually scan for metal.

Figure 10:
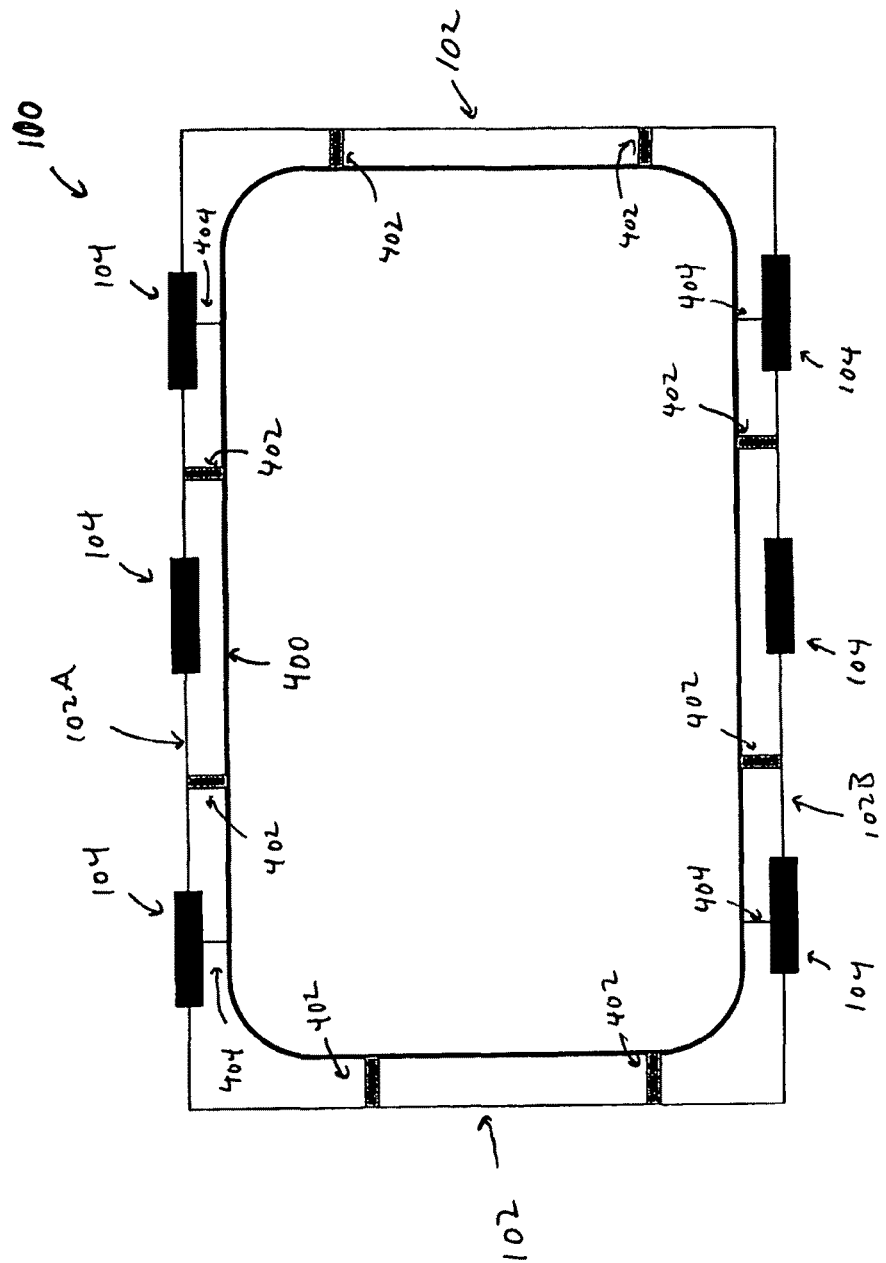
FIG. 10 shows a top down view of a container with composite plugs and a fabric liner containing intrusion detection grids.

Referring to FIG. 10, wall fabric liner 400 is installed inside container 100 to enclose substantially all of the interior volume of the container. Wall fabric 400 contains grids (e.g. electrical or optical grids) that produce an alarm if an intrusion is sensed (e.g. in response to a breach in a portion in one of the grids). For example, fabric liner 200 may include dispersed, interconnected electronic components integrally attached to the liner. Each electronic component of the plurality of components may be in communication with a remotely accessible interface and includes a memory for storing a respective sub-division of at least one numeric value. The numeric values can be inserted, altered, or deleted remotely through the remotely accessible interface. Upon detection of an attempted breach of or tamper with fiber liner 400 one or more of the stored sub-divisions are selectively destroyed. Detection of an attempted breach or tamper is remotely observable upon inspection of a previously stored numeric value, subsequently altered in response to detection of a breach of the secured asset.

Fabric liner 400 has tabs 402 that stick to the panels 102, 102A, 102B for easy installation. In some embodiments, the fabric used along the floor of the container has increased durability, since, in typical applications, fork lifts would need to be driven over it.

Composite plugs 104 contain connections for insertion of leads 404 from the fabric. In some embodiments, these plugs 104 having connections may be installed at or near the corners of the sidewalls of container 100.

When the fabric liner 400 is installed and the connections were made with plugs 104, a scanner could be used to query fabric liner 400 (e.g. using a closed loop modulation/demodulation/response scheme of the type described above) to assure that the system was functioning properly. As described above, fabric liner 400 could contain unique embedded identification information so that by scanning through the plugs 104 to communicate with fabric liner 400, a remote monitor could assure that the plugs were connecting to one another through the fabric rather than through some wiring device that avoided the fabric liner 400. Such a configuration allows an inexpensive intrusion detection system to be installed in steel container 100 and permits a remote check-out that the system was providing the required coverage.

In some embodiments, fabric liner 400 is manufactured as an integrated electrical unit so that a reduced number of wiring connections would need to be made upon installation. In some embodiments, the fabric liner 400 is capable of being checked out before installation, so that the time spent installing a defective fabric can be avoided.

One or more or any part thereof of the control, sensing, detection, scanning or other techniques described above can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The technique can also be implemented as a computer-readable storage medium, configured with a computer program, where the storage medium so configured causes a computer to operate in a specific and predefined manner to perform the functions described herein.

Although in the examples described above container 100 was composed of rectangular panels (e.g. corrugated metal panels), it is to be understood that in various embodiments one or more of the panels may be curved and/or have any suitable shape. For example, a tank type container may be made up of a cylindrical panel and two circular end cap panels. Similarly, plugs 104 may be of any suitable shape including, for example square, rectangular, circular, oval, polygonal, etc. The plugs may be arranged in any suitable pattern on any number of the panels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A container comprising:
    a plurality of panels that define an enclosed volume of the container, said plurality of panels comprising a material having relatively low transmissivity to radiation;
    at least one first plug embedded in a first panel of said plurality of panels, said at least one first plug comprising a material having relatively high transmissivity to radiation; and
    at least one second plug embedded in a second panel of said plurality of panels, said at least one second plug comprising a material having relatively high transmissivity to radiation,
    wherein the at least one first plug and the at least one second plug are aligned opposing each other such that a beam of radiation directed into the enclosed volume of the container through the at least one first plug exits the enclosed volume of the container through the at least one second plug, and
    wherein the material having a relatively low transmissivity blocks a radiation beam having a beam energy sufficient to penetrate the material having a relatively high transmissivity.

2. The container of claim 1, wherein the material having relatively low transmissivity to radiation comprises a metal and the material having relatively high transmissivity to radiation comprises a composite material.

3. The container of claim 2, wherein the at least one first plug and the at least one second plug consist of a material having a relatively high transmissivity of x-ray radiation and the panels comprise a material having a relatively low transmissivity of x-ray radiation.

4. The container of claim 2, wherein the at least one first plug comprises
    a first plurality of plugs embedded in the first panel of the plurality of panels; and
    wherein the at least one second plug comprises plurality of plugs embedded in the second panel of the plurality of panels, and
    wherein each plug of the first plurality of plugs is aligned opposing at least one respective plug of the second plurality of plugs such that a beam of radiation directed into the enclosed volume of the container through an entry plug of the first plurality of plugs exits the enclosed volume of the container through at least one exit plug of the second plurality of plugs.

5. The container of claim 2, wherein the at least one second plug embedded in the second panel comprises a second plurality of plugs embedded within the second panel, wherein the first plug comprises a radiation beam directing element adapted to receive a beam of radiation directed into the enclosed volume of the container through the first plug and direct portions of the beam of radiation to exit the enclosed volume of the container through each plug of the second plurality of plugs.

6. The container of claim 4, wherein the first plurality of plugs and second plurality of plugs are arranged such that substantially all of the enclosed volume can be accessed by scanning beams of radiation directed into the enclosed volume through at least one plug of the first plurality of plugs, pass through a portion of the enclosed volume, and exit the enclosed volume through at least one plug of the second plurality of plugs.

7. The container of claim 2, further comprising a fabric liner disposed adjacent the plurality of panels to form an enclosed portion of the enclosed volume of the container, said fabric liner comprising one or more sensor elements adapted to receive a message modulated on a radiation beam and to detect an intrusion into the enclosed portion, and wherein one or more of the sensor elements are in communication with at least one plug of the at least one first plug and the at least one second plug.

8. The container of claim 7, wherein the one or more sensor elements are selected from a group consisting of: an electrical grid; an optical grid; and combinations thereof.

9. The container of claim 7, wherein the fabric liner is adapted to:
    receive a message modulated on a radiation beam directed through the at least one first plug and;
    transmit a response indicating a presence or absence of an intrusion into the enclosed portion.

10. The container of claim 9, wherein the fabric liner contains one or more storage modules adapted to store electronic identification information, and wherein the fabric liner is adapted to:
    receive a message modulated on the radiation beam directed through the at least one first plug and;
    transmit a response to an external receiver based on the identification information.

11. The container of claim 2, further comprising:
    a dosimeter positioned within the enclosed volume of the container and adapted to detect a presence of fissile material within the enclosed volume of the container;
    a communication module positioned within the enclosed volume of the container and in communication with the dosimeter, said communication module adapted to:
    receive a message modulated on a radiation beam directed through the at least one first plug and;
    transmit a response to an external receiver indicating the presence or absence of fissile material within the enclosed volume.

12. The container of claim 11 wherein the communication module comprises a transmitter from a group consisting of: a Bluetooth transmitter; a wireless transmitter; a radio transmitter; and combinations thereof.

13. A system comprising:
    a container comprising:
    a plurality of panels that define an enclosed volume of the container, said plurality of panels comprising a material having relatively low transmissivity to radiation;
    at least one first plug embedded in a first one of said plurality of panels, said at least one first plug comprising a material having relatively high transmissivity to radiation;
    at least one second plug embedded in a second one of the plurality of panels, and wherein each plug of the at least one first plug and the at least one second plug are aligned opposing each other;

a scanner comprising:
a beam generator to emit a radiation beam having a beam energy sufficient to penetrate the at least one first plug and insufficient to penetrate portions of the plurality of panels comprising the material having relatively low transmissivity to radiation,
wherein the beam generator, when emitting the radiation beam, directs the radiation beam into the enclosed volume of the container through the first plug, across a portion of the enclosed volume of the container, and out of the enclosed volume of the container through the second plug; and
a modulator to modulate a message onto the radiation beam resulting in a modulated radiation beam.

14. The system of claim 13 wherein the scanner comprises a detector adapted to detect the radiation beam exiting out of the enclosed volume of the container through the second plug.

15. The system of claim 14, wherein the enclosed volume of the container contains cargo material, and wherein the scanner is adapted to determine information indicative of a material property of the cargo material based on the radiation beam exiting out of the enclosed volume of the container through the second plug.

16. The system of claim 15, wherein the information indicative of the material property of the cargo material comprises information indicative of a presence of at least one of a group consisting of: metals, fissile materials, electronic components.

17. The system of claim 13, wherein the
at least one first plug comprises a first plurality of plugs embedded in a first panel of the plurality of panels and wherein the container comprises a second plurality of plugs embedded in a second panel of the plurality of panels, wherein each plug of the first plurality of plugs is aligned opposing at least one plug of the second plurality of plugs,
the scanner comprises a plurality of beam generators, each beam generator of the plurality of beam generators configured, respectively, to
emit a radiation beam having a beam energy sufficient to penetrate the at least one first plug comprising a material having relatively high transmissivity to radiation and insufficient to penetrate portions of the plurality of panels comprising the material having relatively low transmissivity to radiation,
the beam being directed into the enclosed volume of the container through a respective one of the first plurality of plugs, across a portion of the enclosed volume of the container, and out of the enclosed volume of the container through a respective one of the second plurality of plugs.

18. The system of claim 13, further comprising:
a remote control unit in remote communication with the scanner and with a receiver unit located in proximity to the scanner; and
a communication module located within the enclosed volume of the container,
wherein the scanner is adapted to modulate a message received from the remote control unit onto at least one radiation beam resulting in a modulated radiation beam, and to direct said modulated radiation beam into the enclosed volume of the container through the at least one first plug,
wherein the communication module is adapted to receive the modulated radiation beam, demodulate the message to obtain a demodulated message from the modulated radiation beam, and transmit a response signal based on the demodulated message,
wherein the receiver unit receives the response signal and transmits information indicative of the response signal to the remote control unit.

19. The system of claim 18, further comprising a dosimeter located within the enclosed volume of the container and adapted to detect a presence of fissile material within the enclosed volume of the container, wherein the communication module is in communication with the dosimeter, and the response signal comprises information indicative of the presence of fissile material within the enclosed volume of the container.

* * * * *